(12) United States Patent
Hubmann

(10) Patent No.: US 10,054,147 B2
(45) Date of Patent: Aug. 21, 2018

(54) SCREW

(71) Applicant: AVVIO GMBH & CO KG, Graz (AT)

(72) Inventor: Gerhard Hubmann, Graz (AT)

(73) Assignee: AVVIO GmbH & Co. KG, Graz (AT)

( * ) Notice: Subject to any disclaimer, the term of this patent is extended or adjusted under 35 U.S.C. 154(b) by 182 days.

(21) Appl. No.: 14/894,867

(22) PCT Filed: May 23, 2014

(86) PCT No.: PCT/EP2014/060633
§ 371 (c)(1),
(2) Date: Nov. 30, 2015

(87) PCT Pub. No.: WO2014/191310
PCT Pub. Date: Dec. 4, 2014

(65) Prior Publication Data
US 2016/0115989 A1    Apr. 28, 2016

(30) Foreign Application Priority Data

May 30, 2013 (TW) .............................. 102210076 U

(51) Int. Cl.
*F16B 25/00* (2006.01)
*F16B 25/10* (2006.01)

(52) U.S. Cl.
CPC ...... *F16B 25/0015* (2013.01); *F16B 25/0036* (2013.01); *F16B 25/0078* (2013.01); *F16B 25/106* (2013.01); *F16B 25/0052* (2013.01); *F16B 25/0063* (2013.01)

(58) Field of Classification Search
CPC .................. F16B 25/0015; F16B 25/0078

USPC ...................................... 411/387.2, 311, 386
See application file for complete search history.

(56) References Cited

U.S. PATENT DOCUMENTS

| | | | | |
|---|---|---|---|---|
| 2,263,137 A | * | 11/1941 | Oestereicher | F16B 15/06 411/311 |
| 5,273,383 A | * | 12/1993 | Hughes | F16B 25/0015 411/180 |
| 6,328,516 B1 | * | 12/2001 | Hettich | F16B 25/0015 411/311 |
| 6,644,904 B2 | * | 11/2003 | Chen | F16B 25/0015 411/386 |
| 6,672,812 B1 | * | 1/2004 | Lin | F16B 25/0015 411/387.2 |
| 7,677,854 B2 | * | 3/2010 | Langewiesche | F16B 25/00 411/386 |
| 8,480,342 B2 | * | 7/2013 | Stiebitz | F16B 25/0015 411/386 |

(Continued)

FOREIGN PATENT DOCUMENTS

| | | |
|---|---|---|
| AT | 412665 | 5/2005 |
| DE | 198 60 085 | 6/2000 |

(Continued)

*Primary Examiner* — Flemming Saether
(74) *Attorney, Agent, or Firm* — Cozen O'Connor

(57) ABSTRACT

A screw having a cylindrical shank with a conical tip at one end and a screw head at the other, and at least one thread section therebetween. The thread section has a thread core. On the thread section, multiple successive thread terms are formed on a shell surface of the thread core. In the region of the thread section, multiple elevations are arranged on the outside of the shell surface of the thread core.

9 Claims, 9 Drawing Sheets

(56) References Cited

U.S. PATENT DOCUMENTS

| | | | |
|---|---|---|---|
| 9,651,079 B2* | 5/2017 | Park | .................. F16B 35/041 |
| 2003/0021653 A1 | 1/2003 | Takasaki | |
| 2013/0039720 A1* | 2/2013 | Shih | .................. F16B 25/0047 |
| | | | 411/387.4 |
| 2017/0108026 A1* | 4/2017 | Yang | .................. F16B 25/103 |

FOREIGN PATENT DOCUMENTS

| | | |
|---|---|---|
| DE | 10 2007 024 240 | 11/2008 |
| EP | 0 705 987 | 4/1996 |
| EP | 2 458 233 | 5/2012 |
| JP | 2010 190269 | 9/2010 |
| WO | WO 2007/073326 | 6/2007 |

\* cited by examiner

SCREW

PRIORITY CLAIM

This is a U.S. national stage of application No. PCT/EP2014/060633, filed on May 23, 2014. Priority is claimed on Taiwanese Application No.: TW 10221007, filed May 30, 2013, the content of which is incorporated herein by reference.

FIELD OF THE INVENTION

The invention relates to a screw, in particular a wood screw.

BACKGROUND OF THE INVENTION

Screws, in particular wood screws, in general have the function to attach at least two components, which components consist, e.g., of wood or a wood-like material. Wood screws are predominantly screwed into wood components, wherein they themselves will cut an appropriate counter-thread. A complementary counter-piece such as, e.g., a nut having an internal counter-thread, which usually is required for securing metal screws, does not exist with wood screws. Such wood screws usually have a cylindrical screw shank having a coniform tip at one shaft end or screw end, respectively, thereof, as well as a screw head or drive head, respectively, at opposite shank end thereof. A helical screw thread, which is wound onto a thread core or onto a screw basic body, respectively, may be produced—depending on the intended use—as a complete thread or as a partial thread, and it usually tapers respectively to the screw tip. In the case of the partial thread, there is distinguished between the smooth screw shank without thread and the thread core in the region of the thread section. The smooth screw shank is then usually arranged in-between the thread section and the screw head, wherein a diameter of the screw shank usually is larger than a diameter of the thread core. With screws having complete threads the thread section extends from the screw tip to the screw head, which is why in this case the screw shank is the thread core and, hence, the diameter of the screw shank corresponds to the diameter of the thread core.

Such wood screws—which are often also designated as chipboard screws—are manually or by way of machinery screwed, with the tip thereof advancing, into a more or less soft material, e.g., into components made from wood or a wood-like material. While screwing, the material of the component is then—unlike with drilling—replaced by the wood screw. A wood screw that is screwed into a building as a connecting part has to be able to receive or transfer, respectively, or discharge different force impacts in-between neighbouring components that are screwed together. These force impacts may be tensile, pressure and/or bending forces, depending on the application thereof. With a screwed-in wood screw, a so-called thread retraction force or retraction carrying capacity is essential, this is that holding force, which is provided by the screw thread screwed-in in the component for connecting the components screwed together.

Due to the material replaced, there is generated pressure while screwing in, which then acts on the screw screwed-in as well as within the component material. This pressure may disadvantageously lead to, on the one side, the component being blasted or destroyed, respectively, while screwing in due to the splitting effect of the screwed-in screw. On the other side, there becomes necessary, due to the pressure acting in the component, an increased force effort or an increased screwing torque, respectively, for screwing the screw. If the screwing resistance or the screwing torque, respectively, are too high, then the screw may be screwed off disadvantageously while it is being screwed into the component, which is why in this case the screw cannot receive or transfer, respectively, anymore forces within the component. For the further development of screws, in particular of wood screws, hence, the following parameters are of particular relevance:

Reduction of screwing resistance or screwing torque, respectively:
A reduction of the screwing resistance or a reduction of the screwing torque, respectively, which are required for screwing in, is desired, as thereby there is enabled easier, less force-consuming screwing by a user, which is why further the risk of injury and accident while screwing in may be reduced. Furthermore, due to a low force and energy effort, there are further reduced the required maintenance and cost efforts of devices for screwing, such as, e.g., screwdrivers on the basis of rechargeable batteries.

Increase of thread retraction force or retraction carrying capacity, respectively:
An increase of the holding force of the screw thread in the component or of the retraction carrying capacity, respectively, of a wood screw is desired, as for the attachment using several wood screws there is required a lesser total amount of connecting means due to an increased holding force of each individual screw. Hence, in overall there may be used fewer connecting means for solving said attachment task, which is why also material resources and costs may be sustainably reduced. In contrast thereto, when using the same amount of connecting means with a respectively increased holding forcer per screw in comparison with conventional screws, this will lead to a higher-grade solution of a certain attachment task and, hence, higher-grade safety with wood construction.

Reduction of the splitting effect on the component while screwing in:
While screwing in a reduction of the splitting effect on the material of the component is desired as there are only guaranteed high holding forces of the screwing in an essentially crack-free component and as there is achieved a possibly low wear of wood components only in the case of a comprehensively crack-free mounting.

From prior art there are known different embodiments of wood screws, aiming at influencing in a rather positive way at least one of the three above-mentioned parameters—reduced screwing resistance as well as reduced splitting effect with increased thread retraction force.

In order to minimize pressure when screwing within the component and, hence, maintain the screwing resistance as low as possible, conventional wood screws are provided, e.g., with a synthetic sliding cover. This, however, will disadvantageously increase production costs and have negative effects on the environment. From prior art there are further known wood screws, in which there is situated a friction part or a so-called countersink, respectively, at the end of the thread in the transition region to the smooth shank part of a screw. The effect and the function of such a friction part are to produce a larger hole diameter in the material of the component than that corresponding to the diameter of the screw shank in the wood, so that, when screwing in, the friction on the following smooth screw shank will be reduced.

Furthermore, there are existent among commercially available wood screws different geometrical embodiments of the screw tips, which each have an at least comparable function as the above mentioned friction part, wherein, however, the friction part is arranged already on the screw tip and not farther back in the transition region from the thread part to the smooth screw shank part, as viewed in the screwing direction. According to embodiment or dependent on the respective producers, respectively, such friction parts in the region of the screw tip are also designated as so-called countersinks, thread rings, counter-threads, driving threads or also as shank rips, drill tips or as scraper grooves. These friction parts arranged at the screw tip all have in common that already when screwing in there is achieved, starting at the tip of the screw, an increased hole diameter in the component, which is why the core diameter of the screw shank, downstream in the screwing direction, on which the thread of the screw is mounted, is exposed to a reduced friction effect. Such embodiments, however, are disadvantageous insofar as due to the increased hole diameter in the component material the thread retraction force or the retraction carrying force, respectively, and, hence, the holding force of the screw thread in the component are reduced.

In regard to the retraction carrying capacity, the holding force of the thread in the component is predominantly determined by way of the thread pitch with commercially available products. In this way, there are commercially available wood screws, which have a so-called high-low-thread (also designated as hi-lo-thread), which aims at increasing the holding force. Such a wood screw is known, for example, from the document AT 412665 B. This wood screw has a so-called compacting tip, wherein transversal rips are inserted in-between the thread flights in the region of the tip. These transversal rips are intended to compact the material by way of replacement, when the screw in turned in, and thus to reduce the friction, when the screw is screwed in. In this way, the retraction force of the screwed-in screw is disadvantageously reduced.

By way of appropriate measures in the region of the screw tip, there is attempted to achieve a reduced splitting effect of wood screws while being screwed into a component, in this way possibly not damaging or destroying, respectively, the material of the component while being screwed in. For this reason, there are known from prior art so-called countersinks, thread rings, counter-threads, driving threads or also shank rips or drill tips, respectively, wherein there is taken into account by the manufacturer that each thread flight is rolled exactly up to the tip. There are further known wood screws, wherein a so-called serrated crown is applied to the screw thread in the region of the screw tip, thereby reducing the undesired splitting effect when screwing into the component material. These measures mentioned are disadvantageous at least in so far as they are rather complex in the production thereof. As the suggestions for improvement that were mentioned above, this is, to produce the screw thread in the region of the screw tip especially exactly or to provide it with an additional serrated crown, respectively, do not constitute any alterations to the fundamental setup of wood screws known per se, also the effects of these suggested measures are rather limited, which is why there may nevertheless occur damage to the component when such wood screws are used.

SUMMARY OF THE INVENTION

It is, hence, the task of the present invention to provide a screw, in particular a wood screw, which prevents the disadvantages stated of prior art, which may be used in components, preferably in components made of wood or a wood-like material, without pre-drilling, and which, respectively in comparison with conventional wood screws, has a reduced screwing resistance or a reduced splitting effect, respectively, when being screwed into the respective components, and which has an increased retraction carrying capacity in the screwed-in position thereof.

With an embodiment of an inventive screw, in particular a wood screw, comprising a cylindrical screw shank, on one end of which there is formed a conical tip, a screw head, which is formed on the other end of the screw shank, and at least one thread section with a thread core, which thread section extends along the longitudinal axis direction from the conical tip in the direction of the screw head, wherein on the at least one thread section multiple successive thread turns are formed, there are arranged in the region of the at least one thread section multiple elevations on the outside on the shell surface of the thread core.

The elevations on the shell surface of the thread core in the region of the at least one thread section are intended to shift and press the internal material of the component from the thread section or the screw shank, respectively, as well as from the elevations or projections, respectively, that project beyond the shell surface of the thread core or beyond a core diameter of the thread section, respectively, when the screw is inserted or sunk into the component. Thereby, the elevations press, as viewed from the longitudinal axis of the screw, the adjoining material of the component essentially radially towards the outside. In this way, there is provided a securing function against screwing-off of the screw, and the retraction carrying capacity is improved, after the screw has been screwed into the component. Due to the securing function of the projections on the shell surface of the thread core of the screw in regard to the component, the screw is not able to become loose easily, even if forces from the outside are exerted onto the component with the screw.

When the screw is screwed in, the thread core is alternatingly offset in the region of the elevations respectively laterally, this is in the radial direction in relation to the longitudinal axis direction, so that the contact surfaces of the screw leading to friction with the component material during screwing will be significantly reduced—up to half of the contact surfaces currently standard with screws. As is shown below, with the inventive screw there may be reduced, due to the dynamic screwing, which is achieved by the offset core diameter during the turning motion of the screw, the required screwing torque, e.g., by up to 50% of the required screwing torque of comparable screws known from prior art.

There are achieved higher holding forces due to the appropriately suitable arrangement of the elevations on the shell surface of the thread core or on the core diameter, respectively, which, in comparison with currently known screws, will lead to a retraction carrying capacity or holding force, respectively, of the screw thread in the component that is increased by up to 30%. Due to the dynamic screwing, which is achieved by the offset core diameter in the turning motion, the wood fibres are hardly damaged while screwing in, and these may adapt back to the core diameter of the thread core of the screwed-in screw, which is provided with elevations, after the screwing process has been completed. In this way, there is provided a form-like serration or a form-fit connection, respectively, between the screwed-in screw and the component surrounding it, leading to an increase of the retraction force.

As a further advantage there is to be mentioned a significantly reduced splitting effect of the component material when screwing in an inventive screw, which has been measured in pre-tests in comparison with conventional comparable screws. Due to the dynamic screwing, which is achieved in an inventive screw by means of the elevations or the offset core diameter, respectively, in the turning motion, the replacement forces is lower and the tensions being developed in the building material, when screwing in, will lead to less splitting or to fewer cracks, respectively, in the material of the component.

The invention thereby is not limited to certain screw dimensions such as, e.g., screw length, nominal screw diameter nor to certain embodiment variants of the conical tip, the screw head, driving profiles on the screw head and/or of thread pitches. The invention also comprises screws having one or several thread sections as well as a partial thread and/or a complete thread.

Also the configuration of the elevations in the region of the at least one thread section may be adapted individually to different applications of the screw. The elevations on the shell surface of the thread core may, for example, have the same or different outlines of the external surfaces thereof. The external surfaces of the elevations advantageously form a curvilinear outline in order to prevent damage to the material of the component when screwing into the screwing hole. Within the scope of the invention it is also further possible to provide elevations on the shell surface of the thread core, which have at least in some sections a jag-like, step-like, corrugated and/or serrated or triangular, respectively, outline of the external surfaces thereof. The jag-like, step-like, corrugated and/or serrated outlines may be arranged on the external surfaces of the elevations in parallel to the longitudinal axis direction or also at an angle oblique to the longitudinal axis direction of the screws.

With a screw having a partial thread there is distinguished between one or several thread sections each having a thread core as well as one or several sections of the smooth screw shank without thread. A core diameter of the thread core thus is usually smaller than a shank diameter of the smooth screw shank. In the case of a screw having a complete thread, the thread section extends along the entire longitudinal axis of the screw from the conical tip to the screw head, which is why the thread core is the screw shank. The core diameter of the thread core thus in this case of a screw having a complete thread will become the shank diameter of the screw shank in the thread section.

In an embodiment of a wood screw, the elevations on the shell surface of the thread core are advantageously arranged in the longitudinal axis direction spaced apart from each other. In this embodiment variant it is advantageous that the individual elevations will lead locally, when being screwed into a component material, respectively to an increased pressure onto the component material, wherein due to the distances between neighbouring elevations the wood fibres may especially effectively adapt back to the regions of the core diameter or the thread core, respectively, between the elevations upon completion of the screwing process, which is why the retraction carrying capacity of the screwed-in screw will be further increased.

In a screw according to an embodiment of the invention, in particular a wood screw, the elevations are especially usefully oriented in parallel to the longitudinal axis direction on the thread core.

In a further alternative embodiment of the invention the elevations in a screw, in particular a wood screw, are each oriented at an angle oblique to the longitudinal axis direction on the thread core. In this embodiment the elevations arranged obliquely to the longitudinal axis direction of the screws will lead to an especially form-fit connection of the screwed-in screw with the component material surrounding it.

In another embodiment of a wood screw, at least one elevation is usefully connected with respectively one edge of two neighbouring thread turns. In this embodiment the elevations, which are connected with the edges of two neighbouring thread turns, are arranged in an especially robust way and secured against damage as far as possible, when the screw is being screwed in.

In a further useful embodiment of the invention at least one elevation in a screw, in particular a wood screws, is formed to the thread turns of the thread section, with the at least one elevation forming projections on both sides of the thread turns. Due to the projections, which project beyond both sides of the thread turns, there is achieved an especially form-fit connection of the screwed-in screw with the component material.

In a preferred variant of the invention the elevations in a screw, in particular a wood screws, are arranged in a straight line on the shell surface of the thread core. The elevations are thereby arranged in a peripheral section or a peripheral segment, respectively, on the shell surface of the thread core. In this embodiment the elevations, which are arranged within a single peripheral section on the shell surface of the thread core, may be advantageously manufactured in an especially economic way.

In a further advantageous embodiment variant the elevations in an inventive screw, in particular a wood screws, are arranged in at least two straight lines on the shell surface of the thread core in the peripheral direction alternatingly offset to each other, wherein first elevations are arranged in a first line in a first peripheral section as well as second elevations are arranged in the longitudinal axis direction each alternatingly to the first elevations in a second line in a second peripheral section of the shell surface of the thread core. The elevations are thereby advantageously arranged in at least two different peripheral sections of the thread core in the peripheral direction alternatingly offset to each other, wherein the first elevations are arranged in a first peripheral section and the second elevations are arranged in the longitudinal axis direction each alternatingly to the first elevations in a second peripheral section.

The straight lines, along which elevations are arranged, may be arranged in any distances from the peripheral sections to each other. There may be arranged, for example, a first peripheral section including a first line of elevations as well as a second peripheral section including a second line of elevations as well as any further peripheral sections having further lines of elevations each offset by a quarter turn or a third turn in a uniform division ratio along the periphery of the shell surface of the thread core. There is also provided within the scope of the invention that any other distances in the peripheral direction along the shell surface of the thread core may be realized between at least two peripheral sections having straight lines of elevations.

In a development of the invention the first elevations and the second elevations are arranged in a screw, in particular a wood screw, in two peripheral sections situated diametrically opposed to the shell surface of the thread core, alternatingly offset to each other. This arrangement has the advantage that due to the peripheral sections that are situated diametrically opposed to the shore surface of the thread core and that have elevations there is achieved an especially uniform motion of the screw, when it is being screwed into a wood component. The screw is put into dynamic vibration by the diametrically opposed elevations when being screwed in, which is why the required screwing torque may be advantageously further reduced.

In an inventive screw, in particular a wood screw, the first elevations are usefully connected in a first peripheral section with respectively one edge of two neighbouring thread turns and the second elevations are formed to respectively the thread turns of the thread section in a second peripheral section, wherein the second elevations each form projections on both sides of the thread turns.

In a further preferred embodiment of the invention in a screw, in particular a wood screw, there is arranged in the longitudinal axis direction per longitudinal axis section respectively only one elevation on the shell surface of the thread core. In this embodiment it is advantageous that the material of the component is especially carefully pushed towards the outside by the only elevation per longitudinal axis section of the screw when being screwed in and this is why there may be possibly prevented an undesired crack formation in the component material while screwing in.

In an inventive screw, in particular a wood screw, an external surface of the elevations forms especially advantageously a curvilinear outline. In this advantageous embodiment the elevations on the shell surface of the thread core have a curvilinear external surface or a rounded, curvilinear outline, respectively. In this way, there is prevented that the elevations cut in the component material while the screw is being screwed in. Due to their rounded external surfaces, the elevations push towards the outside against the elastic wood component while being screwed in, without the component material being additionally torn or cut, respectively, within the screwing hole. In a screwed-in, static position of the screw the elastic wood component may assume the original form thereof as much as possible, and the elevations are thus tightly surrounded by the wood component, whereby the holding force of the thread in the component will further increase.

In a screw according to the invention, in particular a wood screw, a radial thickness of the elevations is especially usefully the same as or smaller than a radial height of the thread turns, wherein the radial thickness of the elevations preferably amounts to ⅔ of the radial height of the thread turns. In this embodiment the elevations attached at the shell surface of the thread core do not project beyond the thread turns or thread flights, respectively, but rather have a maximum radius of the elevations, which is the same as the radius of the thread flights at the most. Hence, the diameter of the screwing hole in the component material is advantageously determined by the external diameter of the thread flights, and the elevations do not project beyond the edges of the thread flights or thread turns, respectively. The maximum radial thickness of the elevations especially preferably amounts to ⅔ of the radial height of the thread turns.

The radial thickness of the elevations is especially advantageously larger than a radius of the screw shank. In this way, the radius of the elevations is advantageously larger than the radius of the smooth screw shank, whereby, while screwing in the screw in a component, there is excluded an undesired friction of the screw shank in regard to the component material adjacent in the screwing hole as far as possible.

In a development of the invention with a screw, in particular a wood screw, there is cut out a groove in the region of the conical tip and the thread section situated thereon. In this embodiment the groove forms a blade in the region of the conical tip as well as a chip space, thereby facilitating screwing-in of the screw in a component.

In a development of the invention in a screw, in particular a wood screw, the thread section extends in a thread section length from the conical tip to the screw head. In this embodiment an inventive screw has a complete thread, which extends form the conical tip to the screw head. In this way, elevations may be especially advantageously arranged on the thread core along the entire thread section length of the complete thread, thus further increasing the holding force of the screwed-in screw in a component. Such inventive screws having a complete thread may be preferably used as reinforcement screws in wood construction.

In summary, the inventive screws, in particular inventive wood screws, have, apart from the previously mentioned advantages, also the further improvements in regard to the products currently available on the market: the production costs of the inventive screws are lower, as herein there is compulsory neither a friction part nor special tip formations. Due to the excellent screwing behaviour, in an inventive screw there may be omitted a sliding cover, thereby saving costs and—due to the omission of covers—preventing damage to the environment. In the processing of the inventive screws in deciduous wood and hardwood, pre-drilling may be omitted if required. This will save time and costs. In particular there is to be mentioned that, for example, the use of the inventive screws in an embodiment as screws having a complete thread for so-called reinforcement screws may lead to especially favourable results in regard to the simplicity of handling as well as the economic solution of given reinforcement tasks.

In the following there are stated in a table individual test data for screwing torques, which were determined by way of an inventive wood screw (which is designated by the abbreviation "DS" in the table) as well as, in comparison thereto, by way of six different screws that are also available on the market (these are designated in the table by the abbreviations "VGS1" to "VGS6"). For the screwing tests wood screws having a nominal diameter (DN) of 8 mm as well as a screw length of 240 mm were used. For this purpose, the different wood screws were compared with each other in 10 test set-ups having respectively identical test conditions—wherein in each test the wood screws were screwed into the same wood component. One and the same electric screwing tool having an integrated torque detection was used for the tests. The test scores of the screwing torques listed in the following table are each listed as a torque in Newton meter (Nm).

TABLE

| Screws | DS | VGS 1 | VGS 2 | VGS 3 | VGS 4 | VGS 5 | VGS 6 |
|---|---|---|---|---|---|---|---|
| Test 1 (Nm) | 3.12 | 8.78 | 7.54 | 6.12 | 5.2 | 5.01 | 4.82 |
| Test 2 (Nm) | 3.02 | 6.62 | 6.02 | 5.04 | 4.82 | 4.83 | 4.35 |
| Test 3 (Nm) | 3.29 | 6.39 | 5.33 | 5.01 | 4.75 | 7.04 | 4.74 |
| Test 4 (Nm) | 3.91 | 7.19 | 6.38 | 4.97 | 5.21 | 7.24 | 4.73 |
| Test 5 (Nm) | 2.89 | 11.77 | 8.42 | 4.25 | 5.48 | 4.56 | 5.53 |
| Test 6 (Nm) | 4.01 | 5.34 | 5.34 | 3.2 | 3.99 | 5.71 | 4.54 |

TABLE-continued

| Screws | DS | VGS 1 | VGS 2 | VGS 3 | VGS 4 | VGS 5 | VGS 6 |
|---|---|---|---|---|---|---|---|
| Test 7 (Nm) | 2.91 | 5.88 | 6.05 | 4.97 | 4.67 | 6.58 | 3.26 |
| Test 8 (Nm) | 2.78 | 5.95 | 3.8 | 4.08 | 4.51 | 6.42 | 4.89 |
| Test 9 (Nm) | 3.64 | 4.34 | 5.11 | 5.11 | 4.61 | 4.7 | 3.55 |
| Test 10 (Nm) | 3.11 | 3.35 | 4.88 | 6.66 | 3.61 | 4.38 | 3.16 |
| Characteristic value accor. DIN EN 14358 (Nm) | 2.47 | 2.988 | 3.583 | 3.148 | 3.57 | 3.71 | 2.88 |
| Screwing torque of screw DS (%) | — | 21 | 45 | 27 | 45 | 50 | 17 |

Comparison of screwing torques between an inventive screw (abbreviation: "DS") and six different conventional screws (Abbreviations: "VG1" to "VG6"):
Data of the tests 1 to 10, screwing torques in Newton meter (Nm);
Characteristic values according to DIN EN 14358, indication in (Nm);
Reduction of the mean screwing torque of the inventive screw "DS" in comparison with the conventional screws (indication in %).

As common in wood construction, for comparative tests there are determined so-called characteristic values according to DIN EN 14358:2006. Thus, when test results are evaluated, these have to be based on a logarithmic normal distribution. Simplified, the respective characteristic values are determined by way of transformation of the test data having the normal logarithm, by subsequent determination of a mean value and a standard deviation for the logarithmized values as well as by subsequent factor determination using factors in table form. The determined characteristic values according to DIN EN 14358 are also to be taken from the table for each screw.

In summary, the tests documented in the table show that for screwing in an inventive screw (abbreviation "DS")—in comparison with conventional screws—there is required advantageously a screwing torque reduced by up to 50%.

BRIEF DESCRIPTION OF THE DRAWINGS

Further details, features and advantages of the invention are recognizable from the following explanation of embodiment examples schematically depicted in the drawings. In the drawings.

DETAILED DESCRIPTION OF THE PRESENTLY PREFERRED EMBODIMENTS

Figure 1:
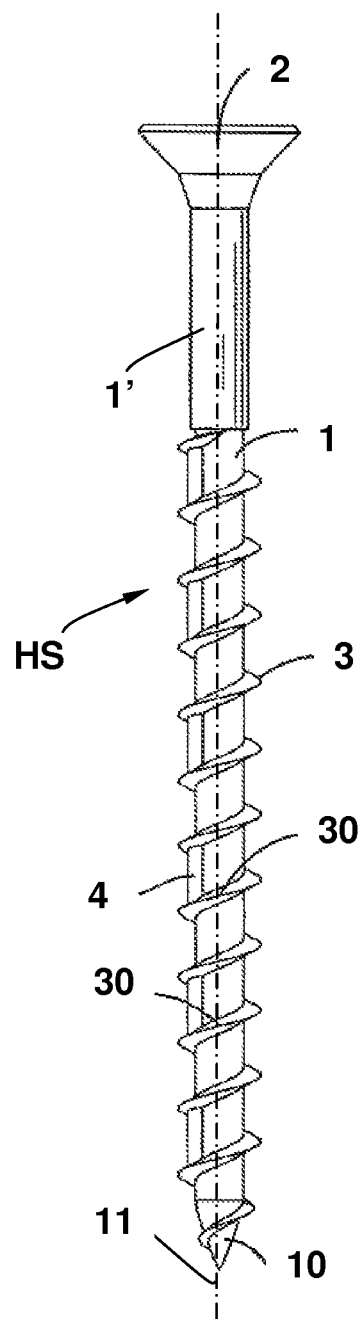
FIG. 1 shows a first inventive embodiment example of a screw having a partial thread in a side view.

The illustrations of FIGS. 1 to 6 show some preferred embodiments of inventive screws. The screws are each embodied as wood screws HS and each include a screw shank 1', a screw head 2, at least one thread section 3 having a thread core 1 as well as multiple elevations 4 or 4', respectively, 4A and/or 4B.

The screw shank 1' has an essentially cylindrical shank body having a longitudinal axis 11. On one end of the screw shank 1' there is formed a conical tip 10, and on the other opposite end of the screw shank 1' there is formed a screw head 2. The thread section 3 extends from the conical tip 10 along the direction towards the opposite other end of the screw shank 1', on which the screw head 2 is arranged, so that multiple successive thread turns 30 are formed on a shell surface of the thread core 1.

Figure 2:
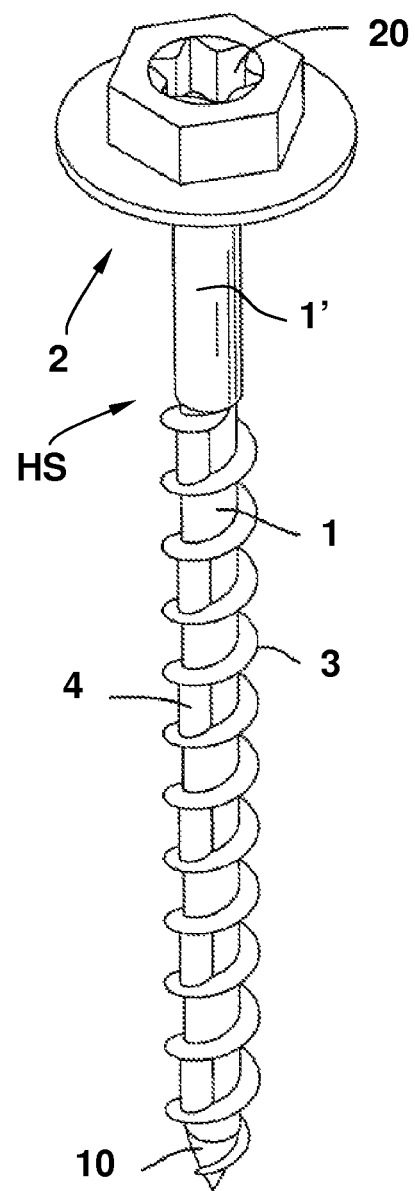
FIG. 2 shows a second inventive embodiment example of a screw having a partial thread in an isometric view oblique from the side.

On the front side of the screw head 2 there is formed, as is shown in FIG. 2, a driving profile 20. This driving profile 20 may have any profile known from prior art per se and may include, for example, a straight slit, a cross slit, a polygonal recess or a star-like recess, in order to being able to receive an appropriate tool such as, e.g., a screwdriver etc. having a connection form or support form, respectively, that is complementary to the driving profile 20. As shown in the two illustrations FIGS. 1 and 2, the screw head 2 may have any of various forms such as, e.g. a round or polygonal, respectively, form. FIG. 1 shows a wood screws HS having a screw head 2, e.g., having an internal hexagon socket, and FIG. 2 shows, for example, a wood screw HS having a combined screw head 2, wherein herein there is embodied an internal Torx as well as an external hexagon socket as two different driving profiles 20. In this way, there may be produced a connection with a corresponding manual or electric tool by way of the screw head 2 itself or the driving profile 20, respectively, in order to enable turning or screwing-in, respectively, of the wood screws (HS) shown.

The elevations 4 or 4A, respectively, shown in the illustrations of FIGS. 1 to 6 are formed to the shell surface of the thread core 1, and they each connect the edges of the thread turns 30. As shown in the sectional view according to FIG. 7, which shows the wood screw HS shown in FIG. 6 in a schematic sectional view in the longitudinal axis direction 11 according to the sectional line 7-7 indicated in FIG. 6, a radial thickness 42 of the elevations 4 or 4A, respectively, herein preferably amounts to about ⅔ of a radial height 32 of the thread turns 30. The elevations 4 or 4A, respectively, are herein oriented essentially in parallel to the longitudinal axis direction 11 of the wood screw HS, wherein the external surfaces of the elevations 4 or 4A, respectively, form a curvilinear area or have a curvilinear outline, respectively. As can be further seen in FIG. 7, a radius 12 of the thread core 1 is smaller than a radius 12' of the screw shank 1', which herein in FIG. 7 is indicated in dashed lines. The radial thickness 42 of the elevations 4 or 4A, respectively, is thus larger than the radius 12' of the screw shank 1'. In this way there is prevented, while screwing in a screw having a partial thread into a component, that-due the shank diameter of the screw shank 1' being increased in comparison to the core diameter of the thread core 1—the friction of the wood screw HS will be disadvantageously increased.

According to the preferred embodiment examples according to the illustrations of FIGS. 1 to 4 the elevations 4 on the shell surface of the thread core 1 are formed in at least one straight line as well as in the longitudinal axis direction 11 spaced apart from each other. The two ends of each elevation 4 are each connected with an edge of two neighbouring thread turns 30. The straight line consisting of the elevations 4 may be oriented in parallel or at an angle to the central axis of the screw shank 1.

In the two illustrations FIG. 1 and FIG. 2 the elevations 4 each are arranged in a single line or in a single peripheral section, respectively, on the shell surface of the thread core 1.

Figures 3, 4:
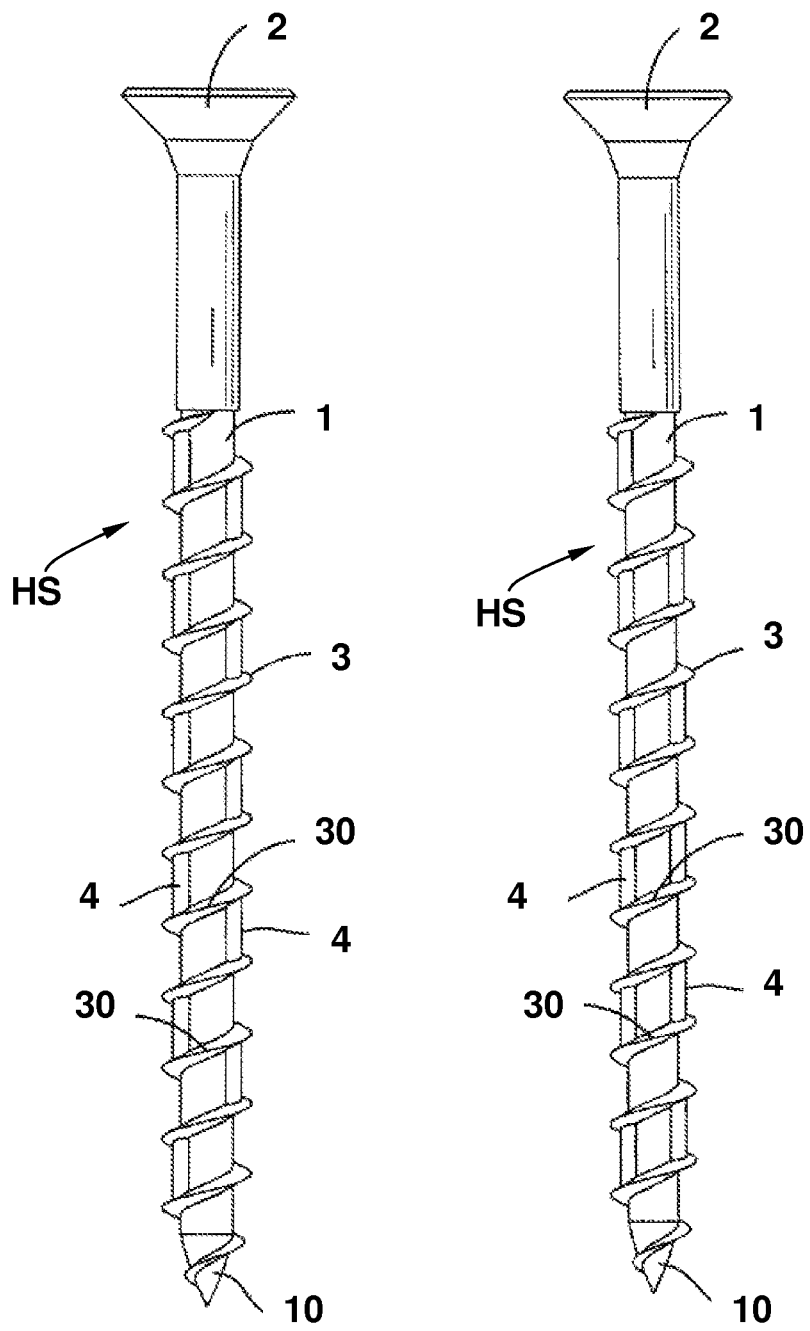
FIG. 3 shows a third inventive embodiment example of a screw having a partial thread in a side view.
FIG. 4 shows a fourth inventive embodiment example of a screw having a partial thread in a side view.

In FIG. 3 the elevations 4 are arranged on the shell surface of the thread core 1 diametrically opposing each other in two straight lines or in two peripheral sections diametrically opposing each other, respectively, each alternating and spaced apart from each other. Thereby, the elevations 4 are arranged in the two straight lines respectively around a thread flight or a thread turn 30, respectively, offset and alternating to each other.

As an alternative it is further possible, as is shown in FIG. 4, that the elevations 4 are arranged diametrically on the shell surface of the thread core 1 in two straight lines or in two peripheral sections, respectively, diametrically opposite and spaced apart from each other. Thereby, the elevations 4 are arranged in the two straight lines diametrically opposing each other, each within the same thread flight or the same thread turn 30, respectively.

Figure 5:
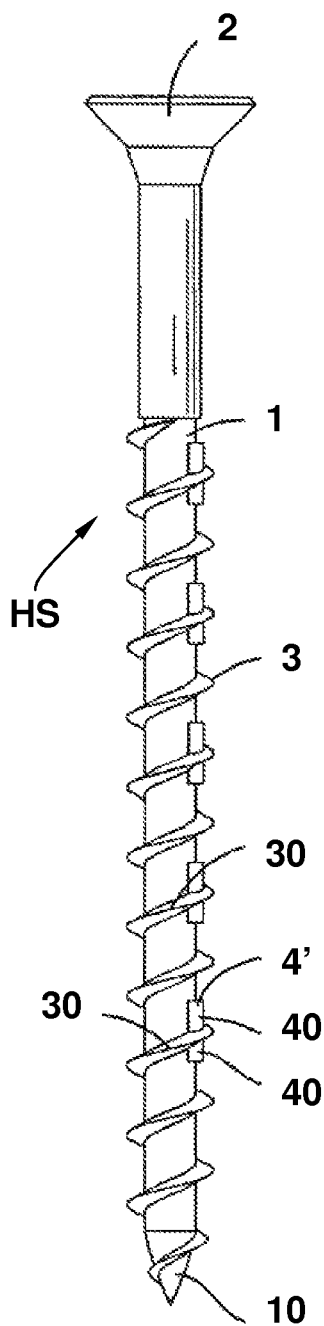
FIG. 5 shows a fifth inventive embodiment example of a screw having a partial thread in a side view.

According to the preferred embodiment example shown in FIG. 5 of an inventive wood screw HS, herein elevations 4' are arranged on the shell surface of the thread core 1 in at least one straight line spaced apart from each other. Thereby, the elevations 4' are formed to the thread turns 30 of the thread section 3, spaced apart from each other in the longitudinal axis direction 11. Accordingly, the elevations 4' form a projection 40 on both sides of the thread turns 30. The elevations 4' are arranged—as shown in FIG. 5—on the thread core 1 in parallel to the longitudinal axis 11 of the screw HS. Similarly, the elevations 4 or 4', respectively, may be oriented on the thread core 1 also at an angle or at multiple and different angles to the central axis 11.

Figure 6:
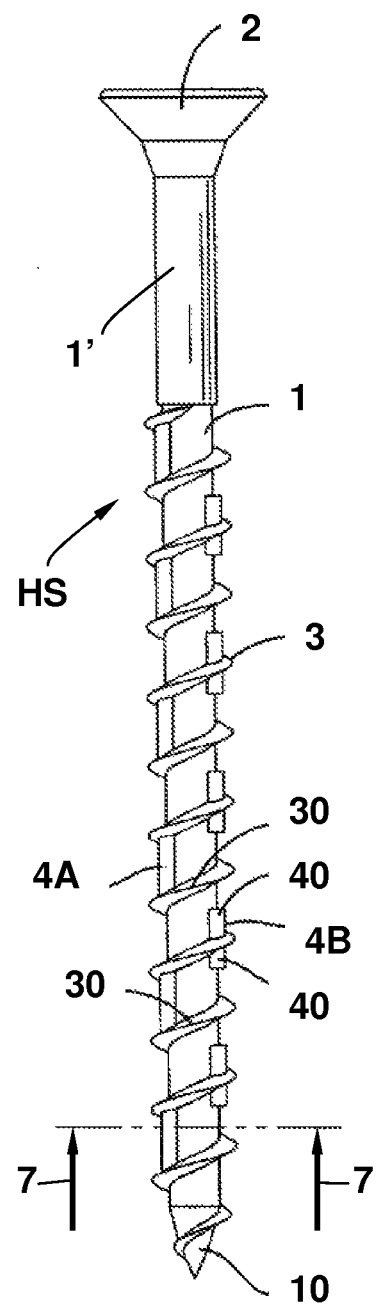
FIG. 6 shows a sixth inventive embodiment example of a screw having a partial thread in a side view.
Figure 7:
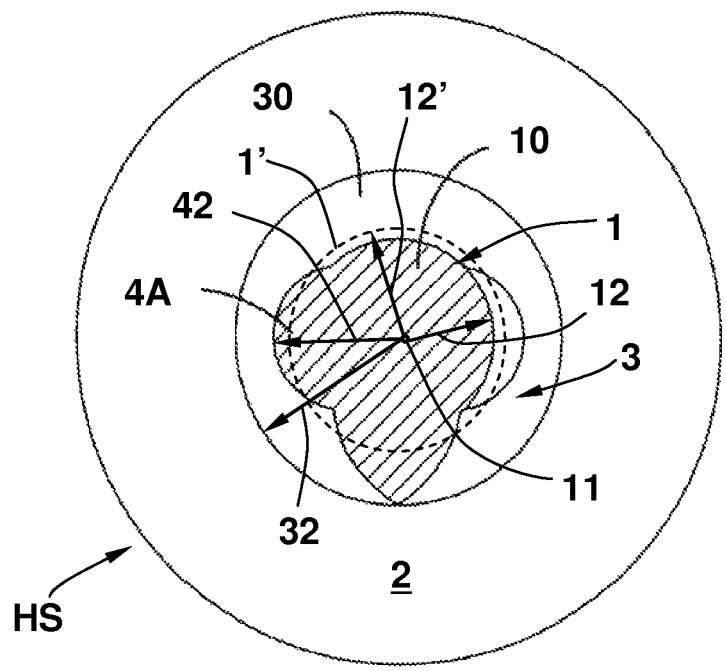
FIG. 7 shows the screw depicted in FIG. 6 in a schematic sectional view in the longitudinal axis direction according to the sectional line 7-7 indicated in FIG. 6.

According to the preferred embodiment example shown in the illustrations of FIG. 6 and FIG. 7 of a wood screw HS, there may be arranged also multiple projections 4A, 4B in different peripheral sections on the shell surface of the thread core 1. Therefore, the elevations are herein separated into first elevations 4A and second elevations 4B. The first elevations 4A are formed on the shell surface of the thread core 1 in a straight line in the longitudinal direction 11 spaced apart from each other. The two ends of each of the first elevations 4A are connected with respectively one edge of two neighbouring thread turns 30. The second elevations 4B are formed on the shell surface of the thread core 1 in another straight line also in the longitudinal axis direction 11, spaced apart from each other. Each of the second elevations 4B is formed to one of the thread turns 30 of the thread section 3, and it correspondingly forms respectively one projection 40 on both sides of the thread turns 30. The straight lines of the elevations 4A or 4B, respectively, may be oriented—as shown in FIG. 6—on the thread core 1 in parallel to the central axis or the longitudinal axis 11, respectively, of the screw. Similarly, it is further possible within the scope of the invention that the elevations 4A and/or the elevations 4B are arranged at an angle or, however, at various angles in regard to the longitudinal axis direction 11 on the shell surface of the thread core 1.

Figure 8:
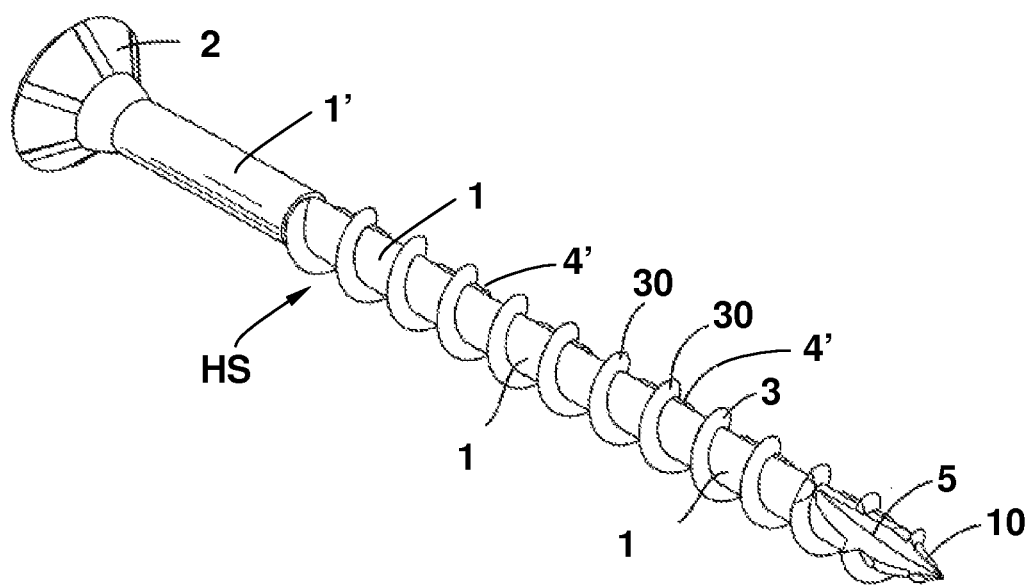
FIG. 8 shows in a perspective obliquely from the side a seventh preferred embodiment example of an inventive screw having a partial thread.

FIG. 8 shows a further preferred embodiment example of an inventive wood screw HS, wherein herein, in the region of the conical tip 10 and of the thread section 3 situated at the conical tip 10, a groove 5 is cut out or milled into, respectively. The groove 5 forms a blade and a chip space for facilitating screwing-in of the wood screw HS into a component not depicted herein.

Figure 9:
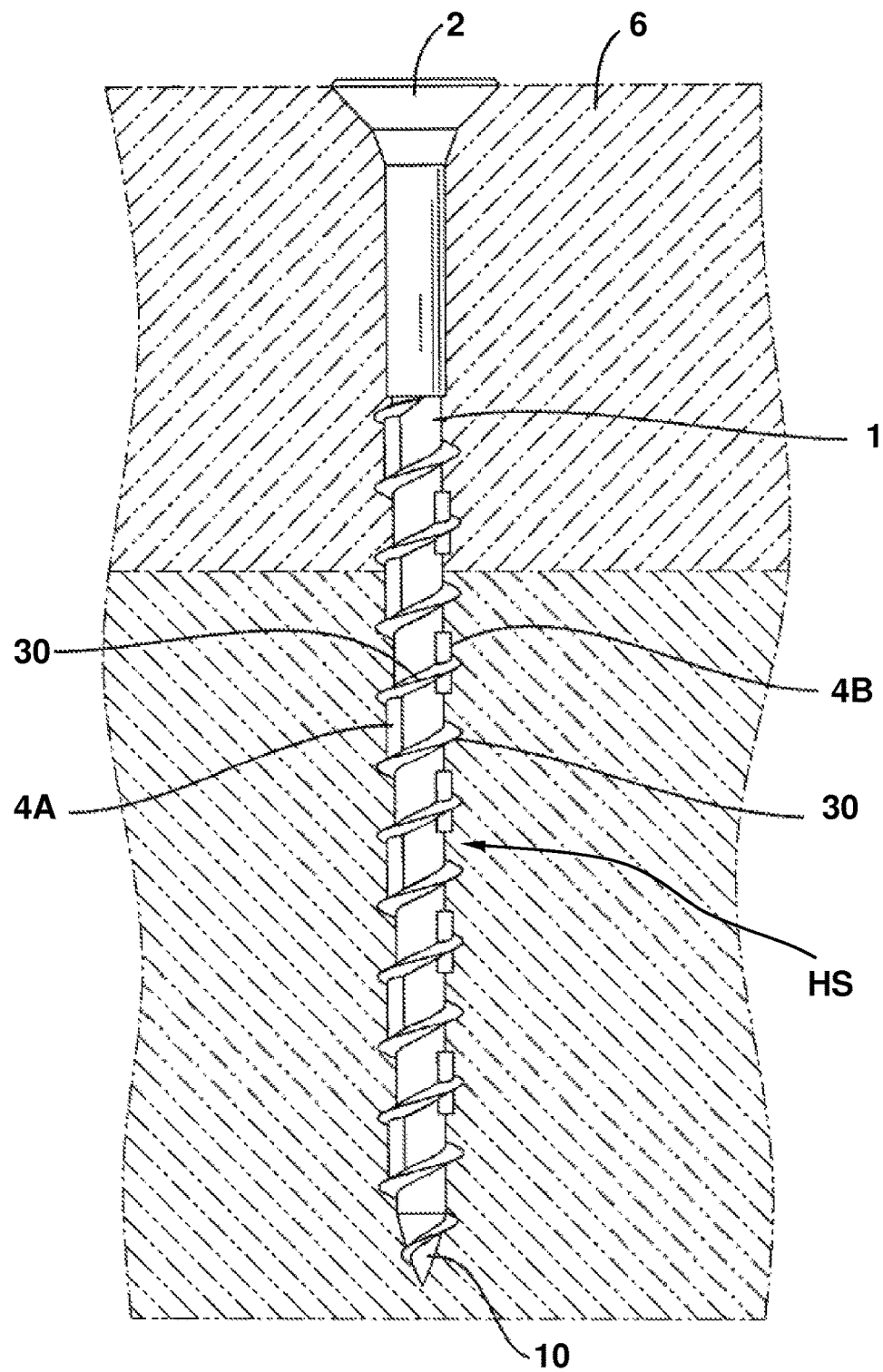
FIG. 9 shows a sectional view from the side of the screw depicted in FIG. 6 in a screwed-in position in a component.
Figure 10:
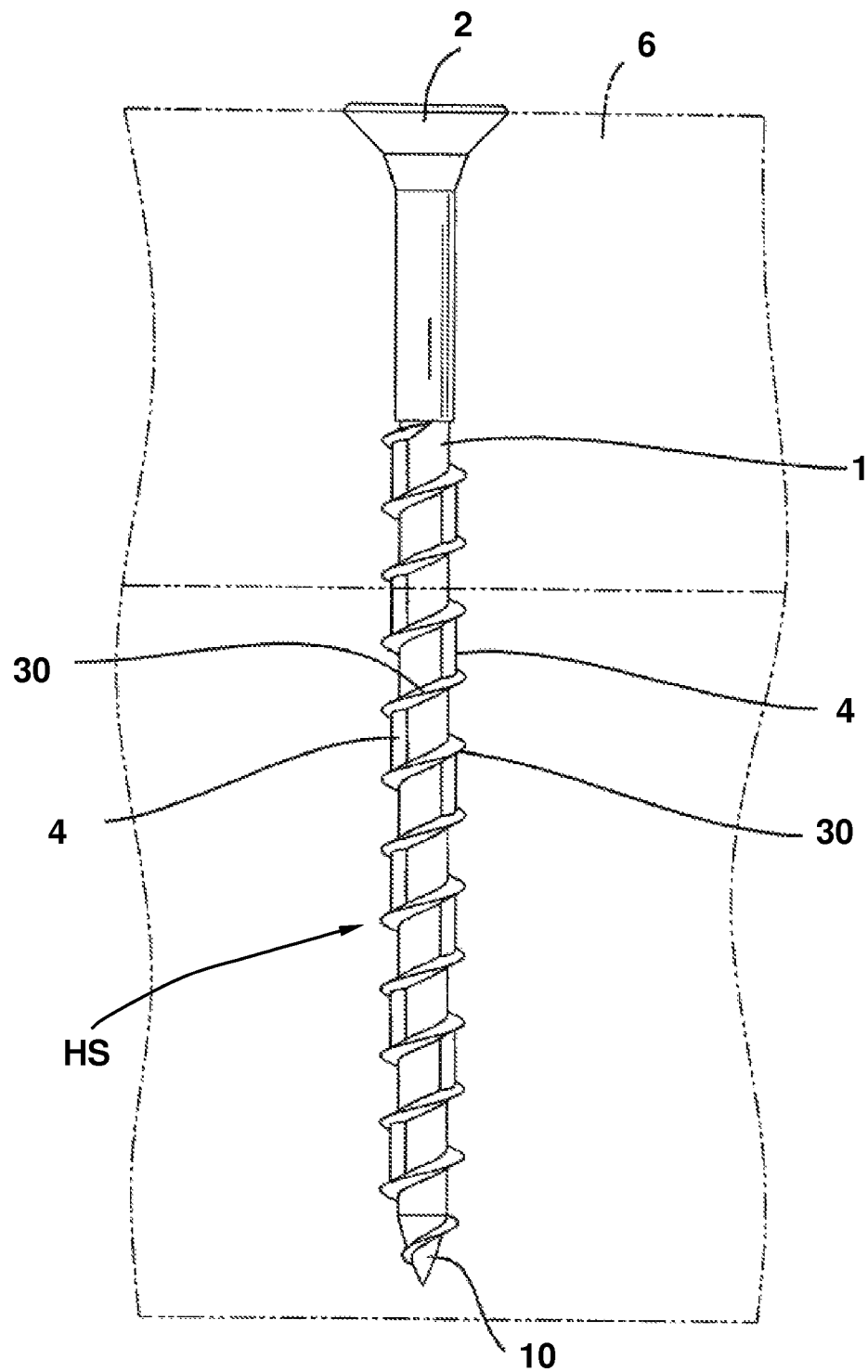
FIG. 10 shows a planar view from the side of the screw shown in FIG. 3 in a screwed-in position in a component.

The previously mentioned developments of the inventive wood screw HS enable that, as shown in the FIGS. 9 and 10, when the wood screw HS is screwed into a component 6 such as a wood component, thus being inserted into this component 6, the interior of the material of the component 6 will be pressed by the thread section 3 or the thread core 1, respectively, and also by the elevations 4 projecting beyond the shell surface of the thread core 1. In this way, there is realized an especially advantageous securing function against screwing-out of the screw, after the screw has been screwed into the component 6. Due to the securing function of the elevations 4, namely the first elevations 4A and the second elevations 4B, on the shell surface of the thread core 1, the wood screw HS in the component 6 has an especially high retraction carrying capacity and will not become loose easily by itself by way of application of external forces onto the component 6.

Figure 11:
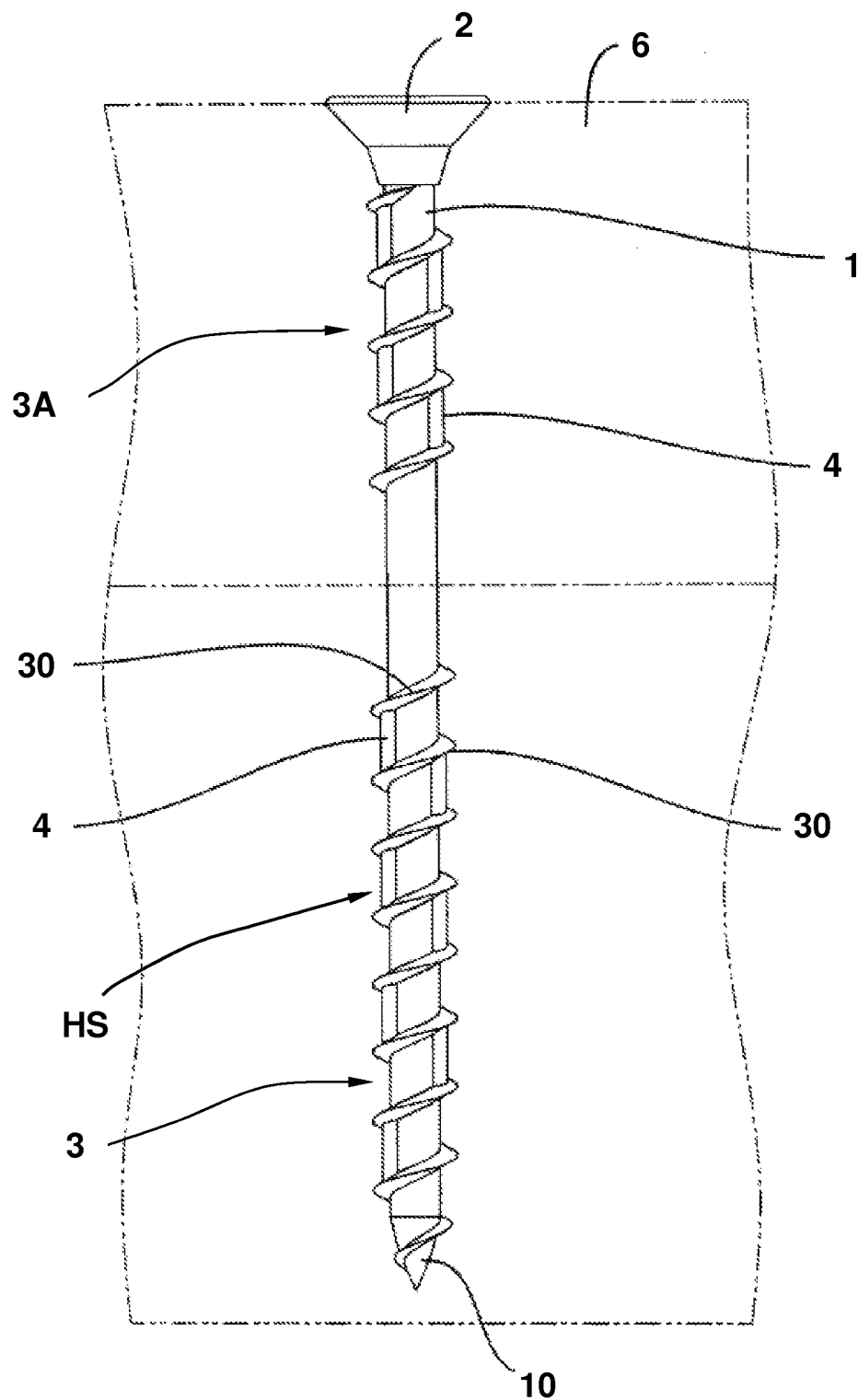
FIG. 11 shows an eighth inventive embodiment example of a screw having two thread sections in a side view in a screwed-in position in a component.

As shown in FIG. 11, herein an inventive wood screw HS has, apart from the thread section 3 having a thread core 1, also a further thread section 3A, which is arranged spaced apart from the thread section 3 on the screw shank. Elevations 4 may also be arranged between the thread turns 30 of the thread section 3A on the shell surface of the thread core 1.

Further, it is possible within the scope of the invention to provide a wood screw that is not explicitly depicted herein, which in addition to a first thread section 3, which includes multiple elevations 4, includes at least one further thread section 3A, in which further thread section there are not provided elevations 4 between the thread turns 30.

Figures 12, 13:
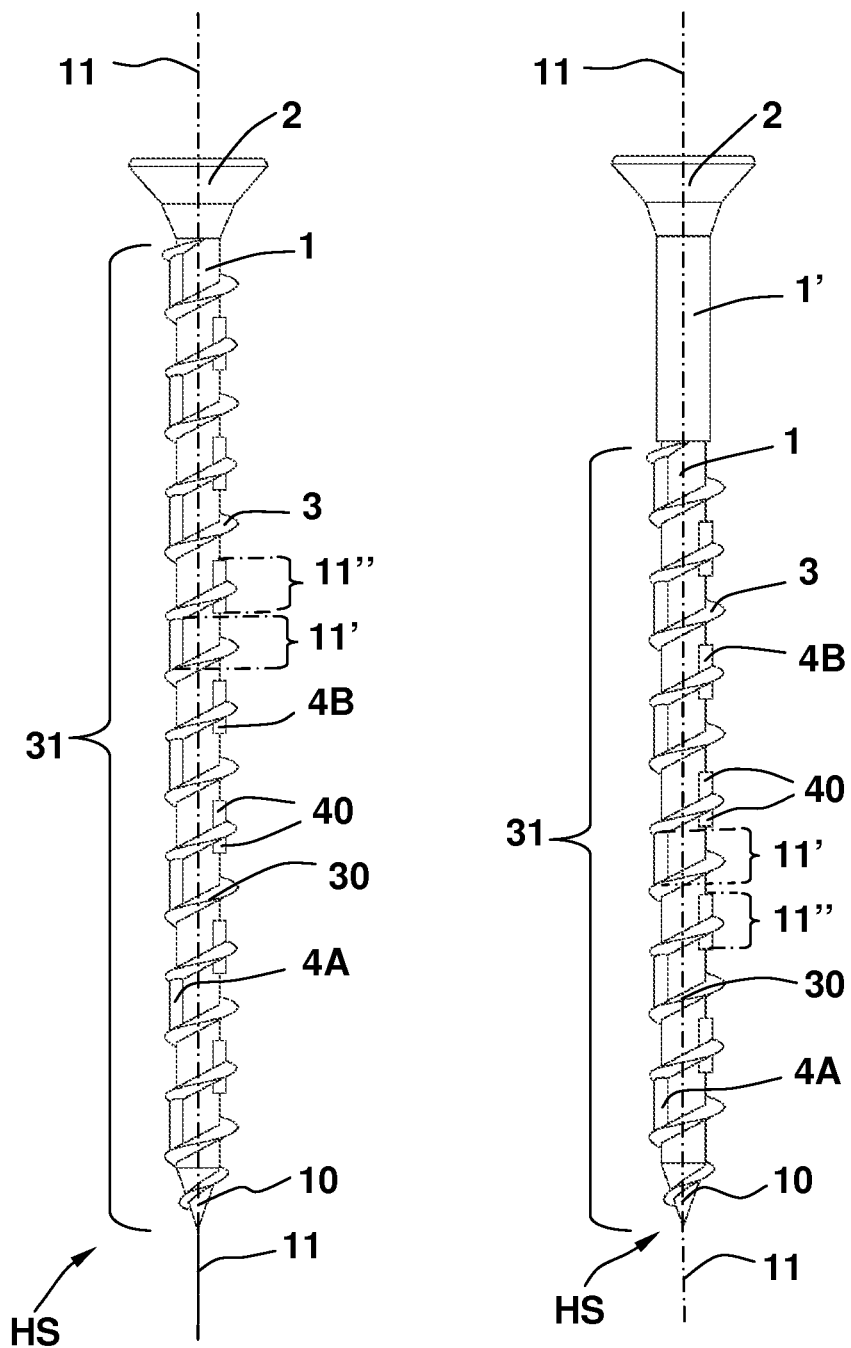
FIG. 12 shows a ninth inventive embodiment example of a screw having a complete thread in a side view.
FIG. 13 shows a tenth inventive embodiment example of a screw having a partial thread in a side view.

The illustrations of FIG. 12 and FIG. 13 each show inventive wood screws HS, wherein the embodiment shown in FIG. 12 includes a complete thread having a thread section 3 with thread turns 30 along a thread section length 31, which thread section 3 extends from the conical tip 10 to the screw head 2. The thread core 1 of the continuous thread section 3 is herein the screw shank of the screw having a complete thread.

In contrast thereto, in FIG. 13 there is depicted a wood screw HS, which is different from the embodiment shown in FIG. 12 essentially by a partial thread, this is a thread section 3 having a reduced thread section length 31. The thread section length 31 herein extends from the conical tip 10 in the longitudinal axis direction 11 to about 80% of the length of the screw body, wherein a smooth section of the screw shank 1' up to the screw head 2 will remain without a thread. In both embodiments of the inventive wood screw HS according to FIG. 12 as well as according to FIG. 13, the elevations 4A as well as 4B are each arranged in parallel to the longitudinal axis direction 11 on the external surface of the shell surface of the thread core 1 in the region of the thread section 3 or along the respective thread section length 31, respectively.

For this purpose, the elevations 4A, 4B are arranged in at least two peripheral sections of the thread core 1 in the peripheral direction alternating and offset to each other, wherein the first elevations 4A are arranged in a first peripheral section as well as the second elevations 4B in the longitudinal axis direction 11, each alternating to the first elevations 4A in a second peripheral section. The two peripheral sections are diametrically opposite on the shell surface of the thread core 1. The first elevations 4A in the first peripheral section each are connected with an edge of two neighbouring thread turns 30, and the second elevations 4B in the second peripheral section are each formed to the thread turns 30 of the thread section 3, wherein the second elevations 4B each form projections 40 on both sides of the thread turns 30.

As can further be seen in the illustrations of FIGS. 12 or FIG. 13, respectively, in the wood screws HS shown herein there is arranged respectively only one elevation 4A or 4B on the shell surface of the thread core 1 in the longitudinal axis direction 11 per longitudinal axis section 11' or 11", respectively. The external surfaces of the elevations 4A, 4B each have a curvilinear area or a curvilinear outline, respectively. The radial thickness 42 of the elevations 4A, 4B herein preferably amounts to ⅔ or about 66%, respectively, of the radial height 32 of the thread turns 30.

Figure 14:
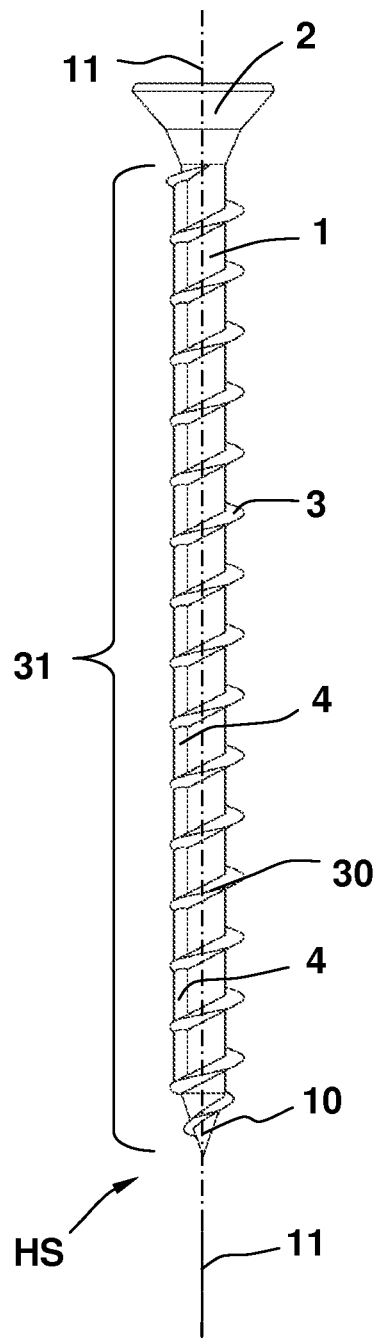
FIG. 14 shows an eleventh inventive embodiment example of a screw having a complete thread in a side view.

Similarly, in the inventive embodiment of a wood screw HS having a complete thread shown in FIG. 14 there is arranged in the longitudinal axis direction 11 per longitudinal axis section respectively only one elevation 4 on the shell surface of the thread core 1. In this embodiment the elevations 4 are arranged each in parallel to the longitudinal axis direction 11 in a straight line on the shell surface of the thread core 1. The elevations 4 each connect the edges of two neighbouring thread turns 30 or thread pitches 30, respectively.

Figure 15:
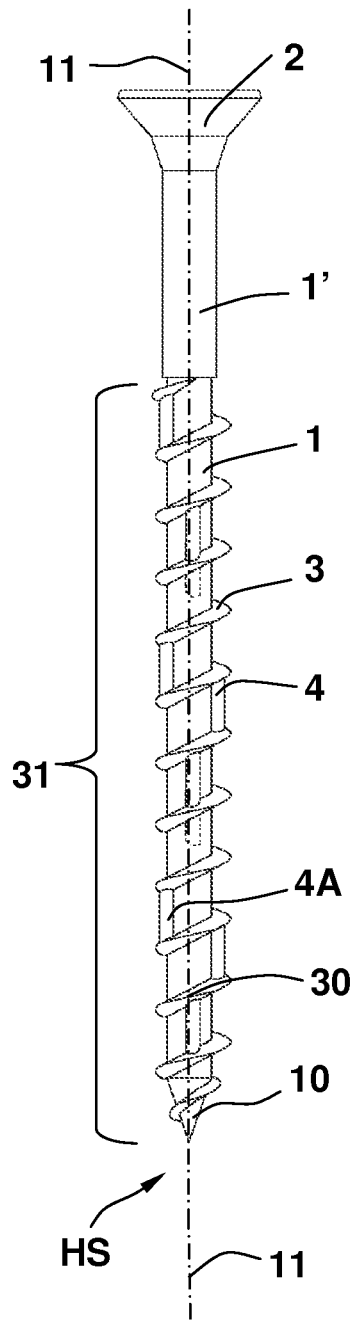
FIG. 15 shows a twelfth inventive embodiment example of a screw having a partial thread in a side view.

As an alternative to the embodiments shown in FIG. 12 or FIG. 13, respectively, it is also possible within the scope of the invention to provide wood screws, in which directly neighbouring elevations 4 or 4A, respectively, are arranged in the longitudinal axis direction 11 in peripheral sections, which peripheral sections are offset to each other, for example, by a quarter turn, on the shell surface of the thread core 1. This embodiment is, for example, illustrated in FIG. 15 by way of a wood screw HS having a partial thread.

LIST OF REFERENCE NUMBERS

HS wood screw
1 thread core
1' screw shank
10 conical tip
11 longitudinal axis of the screw
11' longitudinal axis section (or 11", respectively)
12 radius of the thread core
12' radius of the screw shank
2 screw head
20 driving profile
3 thread section
3A thread section
30 thread turn or thread pitch, respectively
31 length of the thread section
32 radius or radial height, respectively, of the thread turn
4 elevation
4' elevation
4A first elevation
4B second elevation
40 projection
42 radius or radial thickness, respectively, of the elevation
5 groove
6 component

The invention claimed is:

1. A wood screw (HS), comprising a cylindrical screw shank, on one end of which there is formed a conical tip, and on the other end is formed a screw head, and at least one thread section with a thread core, which thread section extends along a longitudinal axis direction from the conical tip in the direction of the screw head, wherein, on the at least one thread section, multiple successive thread turns are formed on a shell surface of the thread core, wherein in the region of the at least one thread section multiple elevations are arranged on the outside on the shell surface of the thread core, wherein the elevations comprise first elevations spaced from each other in the longitudinal axis direction and second elevations spaced from each other in the longitudinal axis direction, wherein the first elevations are arranged in a first straight line on the shell surface of the thread core and the second elevations are arranged in a second straight line on the shell surface of the thread core, wherein the first elevations are, in peripheral direction, diametrically opposite to the second elevations, wherein the first elevations are arranged between adjacent threads turns and are connected with one edge of each of the adjacent threads turns, wherein the first elevations are arranged alternatingly with the second elevations in the longitudinal axis direction, wherein each of the second elevations is formed to one of the thread turns of the thread section and constitutes projections on both sides of the thread turn.

2. The screw according to claim 1, wherein the longitudinal axis comprises longitudinal axis sections, and along the longitudinal axis direction there is arranged in each longitudinal axis section respectively only one elevation on the shell surface of the thread core.

3. The screw according to claim 1, wherein the elevations are arranged only in a section of the thread core having a constant core diameter.

4. The screw according to claim 3, wherein the elevations are arranged in the entire section of the thread core having a constant core diameter.

5. The screw according to claim 1, wherein the elevations are oriented in parallel to the longitudinal axis direction on the thread core.

6. The screw according to claim 1, wherein an external surface of the elevations forms a curvilinear outline.

7. The screw according to claim 1, wherein a radial thickness of the elevations is equal with or smaller than a radial height of the thread turns, wherein the radial thickness of the elevations preferably amounts to ⅔ of the radial height of the thread turns.

8. The screw according to claim 1, wherein in the region of the conical tip and the thread section situated thereon there is cut out a groove.

9. The screw according to claim 1, wherein the thread section extends in a thread section length from the conical tip to the screw head.

\* \* \* \* \*